(12) United States Patent
Kelly et al.

(10) Patent No.: US 8,589,279 B2
(45) Date of Patent: Nov. 19, 2013

(54) METHOD AND SYSTEM FOR GENERATING AND TRADING COMPOSITE CONTRACTS

(75) Inventors: Matthew J. Kelly, Western Springs, IL (US); Richard J. McDonald, Evanston, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 588 days.

(21) Appl. No.: 12/576,571

(22) Filed: Oct. 9, 2009

(65) Prior Publication Data

US 2010/0030702 A1 Feb. 4, 2010

Related U.S. Application Data

(63) Continuation of application No. 10/301,775, filed on Nov. 20, 2002, now Pat. No. 7,624,062.

(60) Provisional application No. 60/365,423, filed on Mar. 18, 2002.

(51) Int. Cl.
*G06Q 40/04* (2012.01)
*G06Q 40/00* (2012.01)

(52) U.S. Cl.
USPC .............................................. 705/37; 705/35

(58) Field of Classification Search
USPC ..................................... 705/35, 37
See application file for complete search history.

(56) References Cited

U.S. PATENT DOCUMENTS

| | | | |
|---|---|---|---|
| 5,297,031 A | 3/1994 | Gutterman et al. | |
| 5,875,437 A | 2/1999 | Atkins | |
| 6,016,483 A * | 1/2000 | Rickard et al. | 705/36 R |
| 6,134,536 A * | 10/2000 | Shepherd | 705/37 |
| 6,157,918 A | 12/2000 | Shepherd | |
| 6,263,321 B1 | 7/2001 | Daughtery, III | |
| 6,304,858 B1 | 10/2001 | Mosler et al. | |
| 6,321,212 B1 | 11/2001 | Lange | |
| 6,381,585 B1 * | 4/2002 | Maples et al. | 705/36 R |
| 6,390,472 B1 | 5/2002 | Vinarsky | |
| 6,456,982 B1 * | 9/2002 | Pilipovic | 705/36 R |
| 7,177,833 B1 * | 2/2007 | Marynowski et al. | 705/38 |
| 7,194,468 B1 * | 3/2007 | Bacila et al. | 1/1 |

(Continued)

FOREIGN PATENT DOCUMENTS

| | | |
|---|---|---|
| EP | 1049037 A2 | 11/2000 |
| WO | WO 01/77940 A1 | 10/2001 |

OTHER PUBLICATIONS

Broker, Julie, "Minneapolis Grain Exchange Owners Approve Cash-Settled Corn and Soybean Futures; Spring Wheat Serial Options and Five-Cent Strike Prices Begin Trading Today", http://www.dtn.com/corp/press/2001/Agriculture/AG06_01_01.cfm, Jun. 1, 2001, printed on Mar. 12, 2002, pp. 1-2.

(Continued)

*Primary Examiner* — Susanna M Meinecke Diaz
*Assistant Examiner* — Jamie Swartz
(74) *Attorney, Agent, or Firm* — Brinks Gilson & Lione

(57) ABSTRACT

The disclosed embodiments provide a system and method for automatically generating a composite contract characterized by at least one parameter. A first subset of eligible component contracts is identified from a set of available component contracts wherein each of the available component contracts is characterized by at least one attribute. A second subset of component contracts is then selected from the first subset to generate the composite contract.

40 Claims, 7 Drawing Sheets

(56) References Cited

U.S. PATENT DOCUMENTS

| | | | |
|---|---|---|---|
| 7,225,150 B2* | 5/2007 | Wilton et al. | 705/35 |
| 7,236,953 B1* | 6/2007 | Cooper et al. | 705/36 R |
| 7,328,184 B1* | 2/2008 | Krause | 705/37 |
| 7,366,692 B2* | 4/2008 | Alcaly et al. | 705/37 |
| 7,464,052 B1* | 12/2008 | Coppola, III | 705/35 |
| 2001/0003179 A1 | 6/2001 | Martyn et al. | |
| 2001/0049651 A1 | 12/2001 | Selleck | |
| 2002/0007329 A1 | 1/2002 | Alcaly et al. | |
| 2002/0026405 A1 | 2/2002 | Haar | |
| 2002/0046294 A1* | 4/2002 | Brodsky et al. | 709/246 |
| 2002/0069155 A1* | 6/2002 | Nafeh et al. | 705/37 |
| 2002/0174047 A1* | 11/2002 | Fernholz | 705/36 |
| 2003/0009415 A1 | 1/2003 | Lutnick et al. | |
| 2003/0125982 A1* | 7/2003 | Ginsberg et al. | 705/1 |
| 2003/0154153 A1* | 8/2003 | Steidlmayer et al. | 705/37 |

OTHER PUBLICATIONS

"Chapter 20: X-Fund Futures", *Chicago Board of Trade*, printed 2002, pp. 2001-2004.

"Index products: E-mini stock index futures and options on futures frequently asked questions", *Chicago Mercantile Exchange*, http://www.cme.com/products/index/products_index_eministockindexfaq.cfm, printed on Aug. 5, 2002, pp. 1-19.

"Index products: E-mini stock index products", *Chicago Mercantile Exchange*, http://www.cme.com/products/index/products_index_esp500_about.cfm, printed on Mar. 12, 2002, pp. 1-12.

"Interest rate products: Eurodollar bundles", *Chicago Mercantile Exchange*, http://www.cme.com/products/interest_rate/products_interstate_ed_bundles.cfm, printed on Oct. 28, 2002, pp. 1-5.

"Interest rate products: Eurodollar packs", *Chicago Mercantile Exchange*, http://www.cme.com/products/interest_rate/products_interestrates_ed_packs.cfm, printed on Jul. 23, 2002, pp. 1-2.

"Interest rate products: Euroyen bundles and packs", *Chicago Mercantile Exchange*, http://www.cme.com/products/interest_rate/products_interestrate_euroyen_bundle.cfm, printed on Jul. 23, 2002, pp. 1-3.

"FTSE Eurotop 100® Index Futures" *NYMEX*, http://www.nymex.com/markets/cont_all.cfm?cid=13&cont_name=info, 2001, printed on Mar. 12, 2002, pp. 1-3.

"Futures Introducing ASX Mini Index Futures", information pamphlet posted by the *Australian Stock Exchange*, printed 2002, pp. 1-9.

"Glossary", *Chicago Mercantile Exchange*, http://www.cme.com/education/glossary/glossaryterm.cfm?term=Synthetic%20futures, printed on Jul. 23, 2002, pp. 1-5.

Kharouf, Jim, "Product Profile: Directional Investing with the CBOT's X-Funds", Jan./Feb. 2002 Issue, *Futures Industry Magazine*, Futures Industry Association, http://www.futuresindustry.org, printed 2002, pp. 1-6.

"Investment Vehicles: Futures Trading", *Terra Nova Online*, http://www.terranovaonline.com/tno_p&s/Futures.asp, printed on Mar. 12, 2002, pp. 1-2.

Jiang, Li, et al., "The Lead-Lag Relation Between Spot and Futures Markets Under Different Short-Selling Regimes. (Statistical Data Included)", *Financial Review* article from http://www.dialogclassic.com/main.vmgw, Aug. 2001, printed on Mar. 12, 2002, pp. 12-35.

"LIFFE to launch Mini FTSE 100 Index Futures on Oct. 17, 2000", http://www.liffe.com/press/releases/000926.htm , Sep. 26, 2000, printed on Mar. 12, 2002, pp. 1-3.

Loomis, Carol J., "The risk that won't go away", *Fortune* article from http://www.dialogclassic.com/main.vmgw, Mar. 7, 1994, printed Mar. 12, 2002, pp. 1-11.

Maestri, Nicole, "Nasdaq Rolls Out New Trading System", *Yahoo! News*, Oct. 14, 2002, http://story.news.yahoo.com/news?tmpl=story2&cid=568&u=/nm/20021014/bs_nm/market . . . printed on Oct. 18, 2002, pp. 1-3.

"Merchants' Exchange Rulebook Chapter 13 Cash-Settled Brent Crude Oil Contract" wysiwyg://105/http://www.merchants-exchange.net/products/contracts.asp, 2002, printed on Mar. 12, 2002, pp. 1-3.

"Mini Value Line Futures and Options Contract Specifications", *Equity Analytics, Ltd.*, http://www.e-analytics.com/fu169.htm, printed on Mar. 12, 2002, pp. 1-3.

Neal, Gregory S., "Inside an Enhanced Index Fund", *Journal of Financial Planning*, wysiwyg://197/http://www.journalfp.net/fpajournal/jfp0499-art9.cfm, Apr. 1999, printed on Mar. 12, 2002, pp. 1-6.

"News Center: Recent News CME Announces Jul. 14 Start of Electronic Spread Trading for Eurodollars on GLOBEX®", *Chicago Mercantile Exchange*, http://www.cme.com/news/shownews.cfm?newsItem=0004FFC4-8C93-1D08-A89380EDE printed on Jul. 23, 2002 pp. 1-3.

"Index products: Product showcase", *Chicago Mercantile Exchange*, http://www.cme.com/products/index/index.cfm, printed on Oct. 25, 2002, pp. 1-2.

"PR Newswire: S&P and NYBOT Launch New Index Futures and Options Contracts", Find articles.com, http://www.findarticles.com/cf_0/m4PRN/2001_Oct_19/79272950/print.jhtml, Oct. 19, 2001, printed on Oct. 28, 2002, pp. 1-3.

"Reference Guide, CBOT X-Funds", *Chicago Board of Trade*, printed 2002, pp. 1-31.

Seaborn, True, "Mercantile Exchange Transaction-Handling System", *Software Patent Institute Database of Software Technologies Record Display*, http:///m.spi.org/cgi-bin/newqry?ISA=Hit...002&rec=1&submit=seeit&csum=19350174424, Dec. 1, 1982, printed on Mar. 12, 2002, pp. 1-5.

Shiller, Robert J., "Measuring Asset Values for Cash Settlement in Derivative Markets: hedonic repeated measures indices and perpetual futures", *Journal of Finance* article from http://www.dialogclassic.com/main.vmgw, Jul. 1993, printed on Mar. 12, 2002, pp. 36-52.

"*TRAKRS Frequently Asked Questions*", http://www.trakrs.com/faq.asp, printed on Aug. 5, 2002, pp. 1-3.

"Clearing services: Audit department; Clearing house; Span®; and Client Management", *Chicago Mercantile Exchange*, http://www.cme.com/risk_management/index.cfm, printed on Oct. 25, 2002, pp. 1-2.

"Contract Specifications for Index Products", http://sntm1sq12/cntrSpecs/Reports/anyGroup.asp?prodType=Index, printed on Feb. 14, 2002, pp. 1-8.

"About CBOT > CBOT News > Press Releases CBOT X-Fund Index Values", http://www.cbot.com/cbot/www/cont_detail/0,1493,10+24+109+5716,00. html, printed on May 7, 2002, pp. 1-2.

"Interest rate products: Eurodollars", *Chicago Mercantile Exchange* http://www.cme.com/products/interest_rate/products_interestrate_eurodollars.cfm, printed on Oct. 23, 2002, pp. 1-3.

CBOT® X-Funds "Preliminary Reference Guide," © 2001 Board of Trade of the City of Chicago, Inc., 23 pages.

Fan, Stallaert, and Whinston. The Internet and the future of financial markets. Nov. 2000. Communications of the ACM, p. 1-6.

* cited by examiner

METHOD AND SYSTEM FOR GENERATING AND TRADING COMPOSITE CONTRACTS

RELATED APPLICATIONS

This application is a continuation under 37 C.F.R. §1.53(b) of U.S. patent application Ser. No. 10/301,775 filed Nov. 20, 2002 now U.S. Pat. No. 7,624,062, which claims the benefit to U.S. Provisional Application Ser. No. 60/365, 423 filed Mar. 18, 2002, the entire disclosures of which are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many financial markets, such as the New York Stock Exchange, American Stock Exchange, Chicago Mercantile Exchange, Tokyo Nikkei Exchange and other financial markets drive the economies of countries throughout the world. These markets measure the movement of investments or financial instruments. Financial instruments are assets or items with value that may be purchased for income, hedging, or capital appreciation.

There are many different types of financial instruments, for example stocks, bonds, futures contracts. Stocks are shares entitling the stockholder to dividends and to other rights of ownership, such as voting rights. A stockholder (a.k.a., a shareholder) has a claim to part of the assets and earnings of the corporation.

Futures contracts are standardized agreements, traded on a futures exchange, to buy or sell a commodity at a specified price at a date in the future. A futures contract specifies the commodity, quality, quantity, delivery date and delivery point or cash settlement. Traditionally, a commodity is a bulk good traded on an exchange, cash or other type of market. Some examples of a commodity include grain, oil, oats, gold, silver and natural gas. More recently, futures contracts have been based on commodities that include foreign currencies, financial instruments and stock indexes. Futures contracts are transferable between parties.

Bundle contracts, also referred to as composite contracts, are exchange-traded agreements to buy or sell a combination of financial instruments, such as a combination of stocks, futures contracts etc. Some composite contracts, including those known as X-funds, traded at the Board of Trade of the City of Chicago, are vehicles to replicate the returns of multiple financial instruments such as futures contracts in a unit, i.e. with one action. In other situations, when a composite contract is bought and/or sold, the actual underlying component contracts are bought and/or sold all at once. The composite contract simplifies trading by permitting the trader to deal with a single instrument having a single set of parameters, for example one price and one quantity, rather than with multiple instruments having different prices and quantities, all at one time. The first type of composite contract is a separate entity with parameters of its own, such as contract size and pricing convention, where the parameters are computed based on the attributes of the underlying component contracts. The attributes of the underlying component contracts used to compute the parameters of the composite contract, taken alone or in combination, may include the price, the quantity, the volatility, the expiration, or other attributes, now or later developed, of the underlying component contracts. The second type of composite commodity has similar parameters, including its own pricing convention, but differs in that a transaction is an expedited surrogate for transactions in the constituent instruments. That is, positions are established or offset in the constituent instruments per the definition of the composite commodity.

As an example of such a composite commodity, we may consider the uses made of a particular futures contract. Eurodollar (ED) futures contracts are futures contracts based on "eurodollars," which are time deposits denominated in U.S. dollars that are deposited in commercial banks outside the U.S. The Eurodollar futures contract, developed and introduced by The Chicago Mercantile Exchange ("CME") in 1981, represents an interest rate on a three-month deposit of $1 million. Eurodollar futures contracts are listed according to a regular pattern: quarterly contracts that terminate in March, June, September, and December ("March Quarterly Cycle contracts") plus additional contracts in the four nearest months not in the March Quarterly Cycle. The March Quarterly Cycle contracts are frequently purchased and sold in equally-weighted groups of four, such as the June 2003, September 2003, December 2003, and March 2004 contracts; these groups are called packs. These four consecutive series of ED futures contracts are quoted on an average net change basis from the previous day's daily settlement price, rounded to one-quarter of a basis point (or tick).

A Eurodollar pack, made up of four consecutive quarterly contracts as discussed above, is designated by a color code, similar to the codes used to designate the underlying ED futures contracts that correspond to its position on a yield curve. Generally nine different packs are traded at any given time, such as red, green, blue, gold, purple, orange, pink, silver and copper, that correspond to Eurodollar future years 2-10.

A combination of packs is referred to as an ED bundle. A Eurodollar futures bundle describes the simultaneous sale or purchase of each one of a series of consecutive Eurodollar packs or Eurodollar futures contracts from one to ten years. (For historical reasons the group of the nearest four contracts in the March Quarterly Cycle is called a bundle, instead of a pack.) The first contract in any bundle is usually the first quarterly contract in the Eurodollar futures strip. Strips of ED futures are simply the coordinated purchase or sale of a series of futures contracts with successive quarterly expiration dates. One exception to the first contract in the bundle being the first quarterly contract in the ED futures strip is the 5-year "forward" bundle, which covers years five through ten of the Eurodollars futures strip. For example, on Mar. 31, 2001, the first contract in a 5-year "forward" bundle would be June 2006 (the 21st contract in the strip), and December 2011 (the 40th contract) the last. Bundles and packs can also be transacted beginning with any contract month in the March Quarterly Cycle, so long as the most deferred contract in the combination is listed for trading. Forty contracts in the March Quarterly Cycle are listed for trading at any given time.

In any bundle, the price is quoted in terms of net change during the current trading session from the previous day's daily settlement price. Specifically, the bundle's price quotation will reflect the simple average of the net price changes of each of the bundle's constituent contracts, rounded to one-quarter of a basis point (or tick).

As an example, consider that all of the nearest 21 contracts (e.g., the June 01 Eurodollar to the June 06 Eurodollar) have enjoyed a three-tick increase in the price since yesterday's settlement; at the same time the prices of each of the next seven contracts (e.g., the September 05 Eurodollar to the March 07 Eurodollar) have posted net gains of four ticks. Under these conditions, the implied fair-value price quotation for a seven-year bundle would be:

$$[\{21*+3\}+(7*+4)]/28 = +3.25 \text{ ticks}$$

This example illustrates an important point that unlike Eurodollar futures prices which are generally quoted in increments of one-half basis point, bundle prices are quoted in increments of one-quarter (¼) of a basis point. For Eurodollar futures, the dollar value of a one-basis point move in the futures price is equal to $25. In contrast, for Eurodollar packs and bundles, the DV01 will always be a multiple of $25, $100 in the case of a pack, $200 in the case of a two-year bundle, etc. LIBOR is the rate of interest at which banks offer to lend funds to other banks, in marketable size, in the London Interbank market.

When a trade occurs, the particulars of the transaction are finalized and confirmed by the buyer and seller. For example, when a buyer and seller have agreed upon the price and quantity of a bundle, they must assign mutually agreeable prices to each of the bundle's constituents. In principle, the buyer and seller may set these component prices with one restriction: the price of at least one constituent Eurodollar contract must lay within that contract's trading range for the day (assuming that at least one of the Eurodollar contracts in the bundle has established a trading range). In the vast majority of cases, traders use a computerized system provided by the Exchange and located on the trading floor that automatically assigns individual prices to the contracts within the bundles.

Bundles are simple structures. They are well suited to traders and investors who deal in LIBOR-based floating rate products. Such traders could include investment banks that routinely carry syndication inventories of floating-rate notes, corporate treasuries that issue floating-rate debt, or commercial bankers who wish to hedge the risk exposure entailed in periodic loan-rollover agreements.

Some bundles' most avid followers are those market participants who deal in long-dated Treasury-Eurodollar ("TED") spreads. A Treasury note or T-note is a marketable fixed-interest rate U.S. government debt security with a maturity greater than 1 year and 10 years or less. A Treasury bill or T-bill is an U.S. government debt security with a maturity less than 1 year. T-bills do not pay a fixed interest rate and they are issued through a competitive bidding process at a discount from par. Such TED spreads trades entail the purchase (or sale) of a treasury security and the simultaneous sale (or purchase) of a strip of Eurodollar futures contracts with a comparable notional term to maturity. A frequently encountered version of these trades comprises a long position in the two-year Treasury note and a short position in some combination of the nearest seven or eight Eurodollar contracts.

Another method by which traders attempt to associate or combine multiple financial instruments is via "synthetic contracts", another form of composite commodity. A "synthetic contract" is a method of referring to a net position of a portfolio or a portion of a portfolio. Synthetic contracts are not entities in themselves but represent means of creating one kind of commodity through combinations of other commodities. The constituent components of the synthetic contract are traded individually, unlike a composite contract which is associated with its component contracts, as discussed above.

A synthetic futures contract can be created as a combination of a put and a call on the same underlying asset with the same strike price. A synthetic futures in which the put is sold and the call is purchased is bullish, i.e. hoping for a price rise, is referred to as a "synthetic long futures." A synthetic futures in which the put is purchased and the call is sold is bearish, i.e. hoping for a price fall, is referred to as a "synthetic short futures." A "synthetic call option" is a combination of a long futures contract and a long put, also referred to as "a synthetic long call." A synthetic call option comprising a combination of a short futures contract and a short put is also referred to as "a synthetic short call." A "synthetic option" is a combination of a futures contract and an option, in which one component, either the contract or the option, is bullish and the other component is bearish. A "synthetic put option" is a combination of a short futures contract and a long call, also referred to as a "synthetic long put." A combination of a long futures contract and a short call is referred to as a "synthetic short put." Generally, synthetic contracts include any financial instrument that is created using a collection of other assets whose combined features are economically the same as those of the instrument(s) it replicates.

Despite their popularity, such transactions in composite contracts have suffered due to lack of any generic standard. Bond dealerships that promote long-date Treasury-Eurodollar spreads to their clients tend to recommend trades that involve odd numbers of Eurodollar contracts, differing from one point in the Eurodollar strip to the next ("weighted bundle or pack"). The dealers customarily justify their formulations by appealing to proprietary yield-curve models. These models purport to link the futures spot interest rates that are represented by the Eurodollar futures strip to the implied zero-coupon yield curve that is embedded in the prices of the U.S. treasury securities.

Further, due to the characteristics of the underlying financial instruments, such as Eurodollar (ED) futures contracts, economically equivalent composite contracts tend to be unevenly-weighted. In addition, composite contracts, such as ED bundle contracts are not widely available, readily acceptable and they do not provide an interpretable benchmark against which their performance can be judged. Further, the process of constructing a composite contract, such as a weighted ED bundle contract, is long and tedious, which prohibits rapid execution of trades in the component contracts. Synthetic contracts provide a convenient reference system for traders to refer to their portfolios but are limited as to the mix of underlying contracts that can be referred to and do not provide for simplified trading or ease of benchmarking.

Accordingly, there is a need for a system to simplify the creation and trading of composite contracts, increase the availability of such contracts to traders, improve their execution rates and simplify interpretation of their performance.

SUMMARY

The present invention is defined by the following claims, and nothing in this section should be taken as a limitation on those claims. By way of introduction, the preferred embodiments described below relate to a system for generating a composite futures contract characterized by at least one parameter. The system includes a terminal operative to transmit an instruction to generate a composite futures contract and a composite futures contract generator coupled with the terminal. Preferably the composite futures contract generator is operative to receive the instruction. The composite futures contract generator is further operative to optionally identify a first subset of eligible component contracts from a set of available component contracts. Each of the available component contracts are characterized by at least one attribute. The composite futures contracts generator is further operative to select a second subset of component contracts from the first subset. Preferably, the composite futures contract generator can generate the composite futures contract based on the second subset. The system further includes a trading engine coupled with the composite futures contract generator. The trading engine is operative to receive the composite futures contract for trading.

The preferred embodiments further relate to a method for automatically generating a first composite futures contract characterized by at least one parameter. In one embodiment, the method includes receiving a first instruction to generate the first composite futures contract, identifying a first subset of eligible component contracts from a set of available component contracts, wherein each of the available component contracts are characterized by at least one attribute, selecting a second subset of component contracts from the first subset, and generating the first composite futures contract based on the second subset.

Further aspects and advantages of the invention are discussed below in conjunction with the preferred embodiments.

DETAILED DESCRIPTION OF THE PRESENTLY PREFERRED EMBODIMENTS

Figure 1:
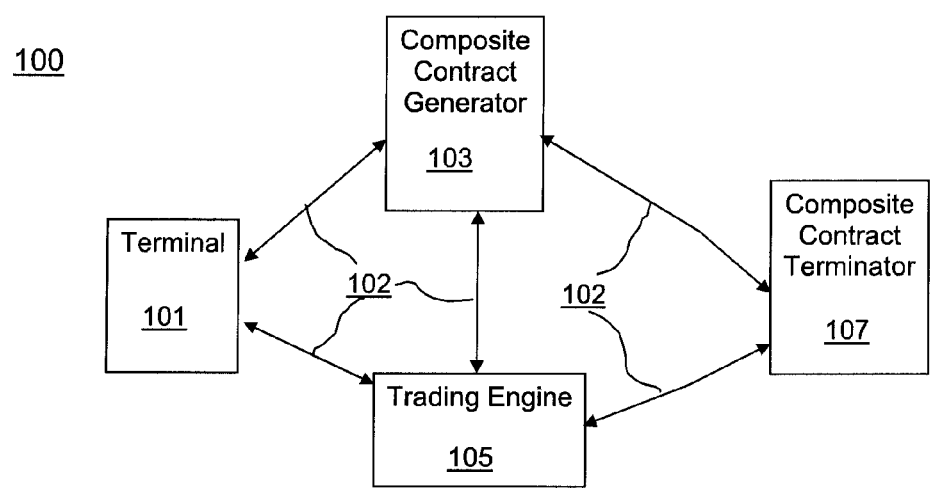
FIG. 1 is a schematic diagram of one embodiment of a composite contract system.

The present embodiment of the invention is described herein with reference to the drawings, where like components are identified with the same reference numerals. These descriptions are intended to be exemplary, in nature and are not intended to limit the scope of the invention.

Composite contracts, also referred to as bundles, are exchange traded agreements to buy or sell a combination of financial instruments, for example a combination of stocks and/or futures contracts, herein referred to as the components, component contracts or component futures contracts. Composite contracts are vehicles to buy/trade multiple futures contract as a unit, i.e. with one action. Parameters or characteristics of the composite contract, for example the price of financial instruments, are computed based on attributes of the underlying components such as the underlying component futures contracts.

Figure 5:
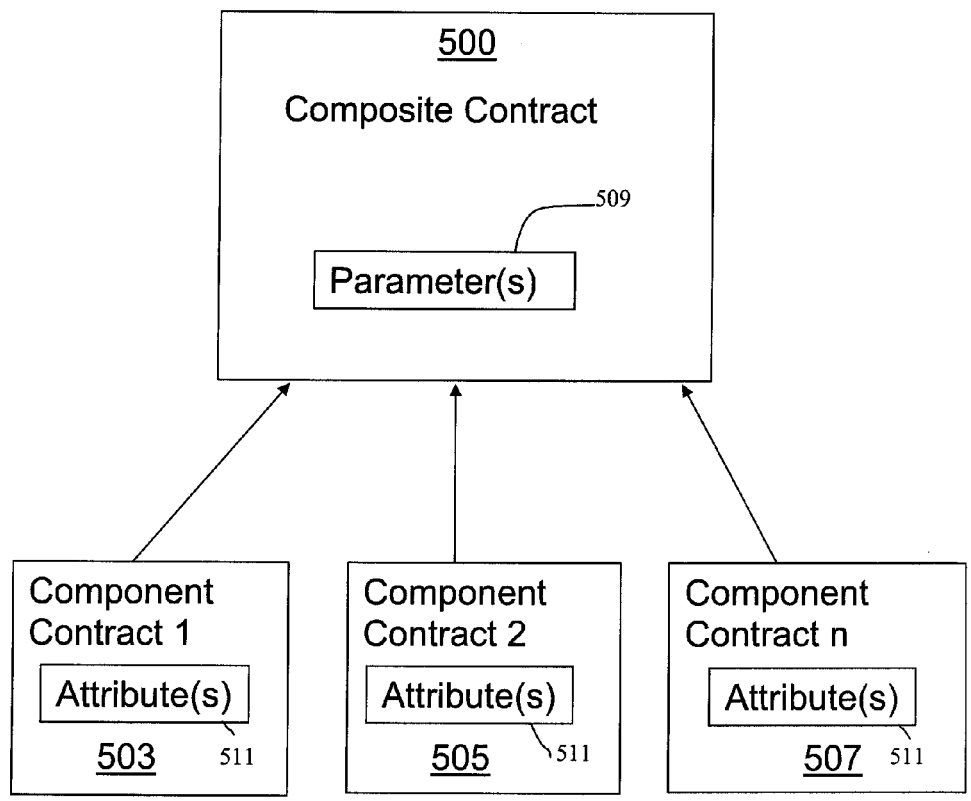
FIG. 5 illustrates an exemplary structure of a composite contract and its relationship with its component contracts.

FIG. 5 shows an exemplary composite contract 500 having parameters 509, such as a price or an expiration date. In this embodiment, the exemplary composite contract 500 is associated with three component contracts 503, 505, 507 each of which is also characterized by attributes 511, such as a price or an expiration. The association of the composite contract 500 with the corresponding component contracts 503, 505, 507 permits the trading of the component contracts 503, 505, 507 by trading of a single composite contract 500. As will be described below, preferably the parameters 509 of the composite contract 500 are determined based on the attributes 511 of the underlying component contracts 503, 505, 507. For example, the maturity date or expiration date of the composite contract 500 may be set to the earliest maturity date or expiration date of the underlying component contracts 503, 505, 507.

When computing the parameters 509 of the composite contract 500, the values of the attributes 511 of the underlying component contracts 503, 505, 507 may be modified, such as scaled and/or weighted to control their influence on the parameter 509 computation. Once the parameters 509 are computed, the composite contract 500 can be traded using those parameters 509. As trades occur, through normal market mechanisms, the parameters 509 may be adjusted from the originally computed values. In one embodiment, the parameters 509, once computed, are disassociated with the attributes 511 of the underlying component contracts 503, 505, 507 and are free to fluctuate independently as trades occur. In another embodiment, the parameters 509 of the composite contract 500 remain linked with the attributes 511 of the underlying components contracts 503, 505, 507 and may fluctuate as the attributes fluctuate according to the normal operation of the market mechanisms.

In the disclosed system, an instruction to generate a composite contract is received by a composite contract generator. The composite contract generator analyzes the instruction and proceeds to generate the composite contract by optionally identifying a first subset of eligible component contracts from a set of available component contracts (all futures contracts, options on futures, options on equities, stocks, bonds, mutual funds, mortgages, exchange traded funds, etc.). Available component contracts are all the financial instruments, such as stocks, certificates of deposits, futures contracts, etc that are available for trading. The eligible component contracts are the subset of available contracts that meet specified criteria, i.e. include or match an attribute that was requested in the instruction sent to the composite contract generator, such as a particular price, volatility etc. Eligible component contracts are those instruments which qualify to be included within composite contracts. Identifying the first subset of eligible component contracts may be performed by limiting the eligible component contracts by any of a variety of mechanisms. For example, an exchange may wish to have a first subset of eligible component contracts include only contracts listed for trading at that exchange or limit the first subset of eligible component contracts to futures on equity index products or agricultural commodities. This may be performed implicitly by limiting the available component contracts to only the eligible component contracts or by an actual selection process.

After the eligible component contracts are identified, a second subset of component contracts is selected from the first subset of component contracts, i.e. the set of eligible component contracts, for inclusion in the composite contract. Once the second subset of component contracts is selected, i.e., once the composite contract is created, the attributes of each of the component contracts are utilized to compute the parameters of the composite contract. For example, the current trading prices of all of the component contracts are averaged to arrive at the trading price of the composite contract.

The composite contract is then associated/linked with the component contracts in such a manner such that they are traded together, i.e. when a trader trades the composite contract, the trader effectively trades the underlying component contracts The generated composite contract is then made available for trading by transmitting the composite contract to a trading engine, such as the GLOBEX® electronic trading system provided by the Chicago Mercantile Exchange Inc., located in Chicago, Ill.

Prior systems and methods for generating composite contracts, such as ED bundle contracts, produced composite contracts which were unevenly weighted, suffered from limited availability, limited market acceptance and/or could only be evaluated against non-standard benchmarks. In addition, prior processes for constructing a composite contract were long and tedious, prohibiting rapid execution of trading of the underlying component contracts.

The disclosed system for generating composite contracts provides a standard composite contract that is widely available, readily acceptable and provides a standardized benchmark by which to judge the performance of parameters of the composite contract. In addition, the disclosed system provides a simple and easy process for generating a composite contract that enables rapid execution of trading of the component contracts.

FIG. 1 is a schematic diagram of one embodiment of a composite contract system 100 for generating and trading composite contracts. The composite contract system 100 includes: a terminal 101, a composite contract generator 103, and a trading engine 105, where all the components are coupled with each other in any suitable combination by a communication link 102 so as to facilitate communications between the components. In an alternative embodiment, the system 100 further includes a composite contract terminator 107 also coupled in combination with the above components by communications link 102. As used herein, the phrase "coupled with" is defined to mean directly connected to or indirectly connected through one or more intermediate components. Such intermediate components may include both hardware and software based components.

Preferably, the communication link 102 connects the terminal 101, composite contract generator 103, trading engine 105 and the optional composite contract terminator 107 over a small geographical area. Alternatively, the communication link 102 may connect the terminal 101, composite contract generator 103, trading engine 105 and the optional composite contract terminator 107 over a vast geographical area. In one embodiment, the communication link 102 includes a network such as a local area network ("LAN"), a wide area network ("WAN"), a metropolitan area network, a virtual area network, a wireless local network, a local bus, a direct or indirect satellite network, or combinations thereof. Further, the communications link 102 may include a publicly accessible network such as the Internet, a privately accessible network such as an Intranet, or a combination of privately and publicly accessible networks. In one embodiment, the communication link 102 includes a data conversion device, such as a modem, that converts data from one form into another, e.g. converts data from one form usable with electronic equipment to another form useable over wireless or landline communication technologies. Such conversion devices include conventional modems that can be used with the public switched telephone network, cellular modems and other network interface devices. Preferably, the communication link 102 provides a high-bandwidth data communication link that achieves high transmission speeds and low latency. Further, the communications link 102 may utilize secure protocols, such as secure-Hypertext Transfer Protocol ("HTTP"), pretty good privacy ("PGP"), etc., to ensure that communications among the devices coupled with the link 102 are authorized, authentic and/or otherwise uncompromised.

Preferably, terminal 101 includes a memory, an interface, a processor, and operating firmware/software that perform functions, such as receiving input from a user, generating and transmitting instructions to a composite contract generator 103 to generate a composite contract and receiving a response to those instructions. Terminal 101 may be a conventional computer, a hybrid personal computer, a personal digital assistant (PDA), a laptop computer, a mobile telephone or any other device that can receive and send information through a communication link. Terminal 101 may also include a display device, a keyboard, a mouse, a touch panel, a graphical user interface (GUI), a printer, a scanner, and/or other input/output devices associated with a computer for interacting with a user of the terminal 101. In one embodiment, terminal 101 is a personal computer having a Pentium class processor, a suitable memory, hard disk and user interface and a network interface compatible with the communications link 102.

As shown in FIG. 1, terminal 101 is connected through the communication link 102 to the trading engine 105. The communications link 102 also connects the trading engine 105 to the composite contract generator 103 and, in an alternate embodiment, to the composite contract terminator 107. In the disclosed embodiments, the trading engine 105 includes a matching system, i.e. a system capable of receiving bids and offers and otherwise managing the execution of trades in a marketplace, such as the GLOBEX® trading system provided by the Chicago Mercantile Exchange Inc., located in Chicago, Ill. The trading engine 105 matches orders electronically according to one or more trade matching algorithms, such as a first-in-first-served algorithm, an allocation algorithm, or a market maker priority algorithm. An "order" can be a bid to purchase or an offer to sell. In one embodiment, the trading engine 105 is implemented as a software program which executes on a computer system capable of executing the trading engine 105 and interfacing with the communications link 102. Alternatively, the trading engine 105 may be implemented as a combination of hardware and software.

Although the trading engine 105 and the composite contract generator 103 are illustrated as separate devices that are capable of being run on one or more computers, in alternative embodiments these systems and methods can also be integrated within a single device. The trading engine 105 is further capable of operating in an automatic, semi-automatic or manual fashion.

The terminal 101 is also connected by the communication link 102 to the composite contract generator 103. The composite contract generator 103 is further connected by the communication link 102 to the trading engine 105 and the composite contract terminator 107.

Figure 2:
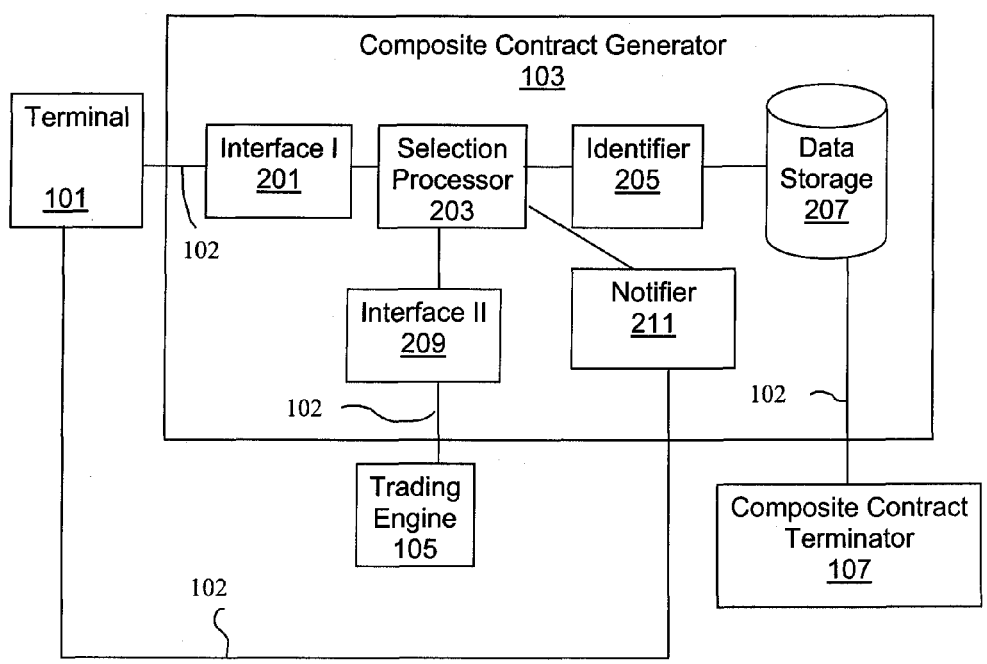
FIG. 2 illustrates a schematic diagram of one embodiment of a composite contract generator for use with the system of FIG. 1.

FIG. 2 illustrates a schematic diagram of an embodiment of a composite contract generator. The composite contract generator 103 receives an instruction from terminal 101 to generate a composite contract and subsequently provide notification to the terminal 101 that the composite contract is available for trading or currently is being traded. In one embodiment, the instruction includes criteria received from the user of the terminal 101 which the generator 103 uses for generating a composite contract. Such criteria may include the types of contracts that the component contracts are to be selected from, i.e., a specification of which contracts, from all available contracts, are eligible for inclusion in the composite contract. Further, the criteria contained within the instruction may include conditions or factors for determining which of the eligible component contracts to select for actual inclusion in the resultant composite contract. In addition, the instruction may include other specifications such as baseline values for use in computing the trading price, initial trading availability date, expiration date, or other trading parameters. In one embodiment, the instruction is formatted using a proprietary format. Alternatively, the instruction may utilize a standardized instruction format.

The criteria by which a composite contact is generated may be specified entirely within the instruction, specified entirely as a function of the selection algorithm of the selection processor 203, described below, or a combination thereof. The disclosed embodiments balance the degree of control that a user has with respect to specifying the selection criteria against simplifying the generation process. In one embodiment, the degree of user control may be varied depending on the user.

Once the composite contract has been generated, the composite contract generator 103 provides the trading engine 105 with information relating to the generated composite contract to initiate trading of the composite contract. For example, the generator 103 may provide the trading engine 105 with an electronic record containing a description of the composite contract, i.e. a list of the component contracts, the composite contract price and any other parameters that the trading engine 105 requires to make the composite contract available to the market participants.

The composite contract generator 103 includes a first interface 201, a selection processor 203, an identifier 205, a data storage 207, a second interface 209 and a notifier 211. The first interface 201 couples the generator 103 with the terminal 101 as described above. The selection processor 203 is coupled with the first interface 201, the identifier 205, the second interface 209 and the notifier 211. The identifier 205 is further coupled with the data storage 207. The composite contract generator 103 may be implemented in either hardware or software, or combinations thereof. In one embodiment, the composite contract generator 103 is implemented within software residing within a computer coupled with the communications link 102.

The first interface 201 receives information from terminal 101 via the communication link 102, such as an instruction to generate a composite contract, as described above. Information received from terminal 101 by the first interface 201 is transmitted from first interface 201 to the selection processor 203. In one embodiment, the first interface 201 further generates an acknowledgement communication to the terminal 101 acknowledging receipt of the information.

In one embodiment, the first interface 201 is a software algorithm that is compatible with the communication link 102. For example the first interface 201 is an application program interface (API) program compatible with communication link 102. Alternatively, the first interface 201 is a hardware device having pre-processing functionality that is compatible with the communication link 102. For example, the first interface 201 is a network interface, optical sensor interface, or Ethernet interface that is compatible with the communication link 102. In another embodiment, the first interface 201 may be implemented as a combination of software and hardware that is compatible with the communication link 102. Further, the first interface 201 may include software functionality to decode, decrypt, authenticate or otherwise implement secure communications between the terminal 101 and the generator 103.

Selection processor 203 receives the information, i.e. instructions, from the first interface 201 and acts on the instructions. Generally, selection processor 203 identifies, based on the instructions it received from the terminal 101 via the first interface 201, which contracts, from all available contracts, are eligible to be considered for inclusion in the composite contract, also referred to herein as a first level selection. Identification of eligible component contracts from the pool of available contracts is performed by the identifier 205. The identifier 205 is coupled with a data storage 207 which stores representative data of all available contracts. In one embodiment, as will be described, the identifier performs a basic boolean, numeric or alphanumeric search on the data stored in the data storage using search parameters provided by the selection processor 203. In this embodiment, the identifier 205 operates under the direction of the selection processor 203. In an alternate embodiment, the selection processor 203 includes the identifier 205. In another embodiment, the data storage 207 is kept up to date by the trading engine 105 as to the currently available contracts.

Preferably, the data storage 207 is a conventional storage system, such as a hard disk or memory. Data storage 207 stores data regarding the following contracts available in the associated exchange/trading engine: interest rate futures contracts, commodity futures contracts, domestic currency futures contracts, foreign currency contracts, exchange futures contracts, single stock futures contracts, chemical futures contracts, financial index futures contracts, weather futures contracts, foreign based futures contracts, stocks, options, certificates of deposits, bonds, an amount of cash, assets, and other exchange traded instruments, such as Exchange Trade Funds ("ETF's"). Assets refer to stock, certificate of deposits or cash. ETF is a security that tracks an index but has the flexibility of trading like a stock. ETF represents a basket of stocks that reflect an index. The difference is that an ETF isn't a mutual fund, it trades just like any other company on a stock exchange. Available contracts may be puts, calls, long or short. Data storage 207 may also include market data information, expert opinion and financial quotes.

From those eligible contracts identified by the identifier 205, the selection processor 203 selects, again based on the received instructions, particular component contracts for inclusion in a composite contract, also referred to herein as a second level selection. Although performed in separate processes, the first and second level selections may also be performed as a single selection process. Data representing the available contracts is stored on the data storage 207 that is coupled with the identifier 205.

As discussed above, the instructions include information such as the selection criteria for choosing which component contracts, based on their attributes, should be included in the composite contracts. The selection of component contracts by the selection processor 203 and identifier 205 is accomplished by using one or more selection algorithms. The selection algorithms include computational or decisional processing routines which generally accept the instruction provided criteria and the parameters of the contracts undergoing evaluation as inputs to one or more functions, the output of which determines the selection of the given contract. The functions may include Boolean, numeric or alphanumeric based computations or combinations thereof. The selection algorithms may factor in the user defined criteria provided in the instructions or the algorithm may operate autonomously to select component contracts or a combination thereof, as described above. First level selections may use a selection algorithm different from the selection algorithm used for second level selections, or the algorithms may be the same. Where the same selection algorithm is used for both the first and second level selections, the criteria for each algorithm may be the same or different.

In one embodiment, selection processor 203 and identifier 205 are implemented in software as part of the composite contract generator 103 described above. For example, the selection processor 203 and identifier 205 may be processing application programs. Alternatively, the selection processor 203 and/or identifier 205 may be implemented as hardware integrated with the hardware and/or software that form the composite contract generator 103. Preferably, this hardware includes microprocessors, micro-controllers, or digital signal processors, having an electronic erasable program read only memory (EEPROM) or Flash memory, static random access memory (RAM), a clocking/timing circuit, or any typical processor utilized in an electrical device. In another embodiment, the selection processor 203 and/or identifier may be implemented as a combination software algorithm and hardware device.

The selection algorithms work with the data storage 207, which stores data which describes available component contracts and other factors, to determine the set of eligible component contracts from which to generate the composite contract.

Examples of selection algorithms for use with first level selections include algorithms based on current or average trading price, expiration, contract type, underlying commodity type, price volatility, user preference, or combinations thereof. These criteria may be compared against corresponding parameters of the available contracts being evaluated using a Boolean based equality or threshold type function or a numeric based computation, or combinations thereof. It will be appreciated that other selection algorithms, now or later developed, may also be used, including selection algorithms listed below for second level selection, including selection algorithms based on factors such as weather conditions, market indexes, etc., or combinations thereof. For example, the selection algorithm may accept the type of contract and minimum trading price for inclusion in the eligible contract subset, such as gold futures with a minimum trading price of $350. The selection algorithm will review all available contracts and select all gold futures contracts based on matching of the underlying commodity type. Next the selection algorithm performs a combined Boolean/numeric computation to determine which gold contracts are trading at a price equal to or greater than the specified threshold value of $350. The resultant subset of contracts then meets the specified criteria.

Examples of selection algorithms for use with second level selections include those algorithms listed above for first level selection plus a weighting based algorithm which selects contracts from the eligible component contracts for inclusion in the composite contract based on a weighting value assigned to each eligible contract, a market participation algorithm which selects contracts from the eligible component contracts based on votes from market participants, a product mix algorithm which selects diverse component contracts from the eligible component contracts based on volatility, investment or a categorized grouping and an aggregate pooling algorithm which selects contracts from the eligible component contracts based on a common grouping or categorization such as a large capitalization, small capitalization, currency and agricultural products. The selection processor 203 may implement one or more of these selection algorithms. As explained above for the selection algorithms for first level selection, the selection algorithms used in the second level selection may include Boolean based equality or threshold type functions or numeric based computations, or combinations thereof, and further the first and second level selections may be combined using a combined selection algorithm which both determines the eligible component contracts and those contracts which will ultimately be included in the composite contract.

A weighting algorithm includes an index-based function based on a market capitalization of the eligible components or a futures based index. As explained above, eligible component contracts include financial instruments, such as stocks, bonds, agricultural futures contracts that are available for trading. In one embodiment, the eligible components which have a greater share or higher trading volumes are assigned a higher weighting value. Those eligible components whose weighting value meets or exceeds a specified threshold are then selected for inclusion in the resultant composite contract. Preferably, the post processing computation of the parameters, such as the price, of the composite contract, the weighting values of the included component contracts are utilized to adjust the influence of the particular component contract's attributes upon the computed composite contract parameters.

A market participation selection algorithm is used to select the eligible components in the composite contract based on a voting process, which will be described in more detail in conjunction with FIG. 6. In the preferred process, the market participants may cast votes for the component contracts that they want included in the composite contract. Preferably, as described above, during post processing computation of the parameters, such as the price, of the composite contract, the number of votes received by or the number of market participants who voted for the included component contracts may be utilized to adjust the influence of the particular component contract's attributes upon the computed composite contract parameters. For example, if a first market participant casts 7 votes for a particular component and a second market participant casts 1 vote for the same particular component, those votes and the votes from other market participants will be tallied. If that particular component is ultimately included in the composite contract, the first market participant may be obligated to participate in the trading of the composite contract at a higher level than the second market participant.

A product mix algorithm selects component contracts based upon a desired level of diversification among the component contracts of the composite contract. Such diversification may be based on volatility, investment group and/or a categorized group. The aggregate pooling selection algorithm provides a selection of eligible components based on a categorization or grouping of the underlying component contracts, such as a large capitalization, small capitalization, currency and/or agricultural products.

Other selection algorithms include algorithms based on a calendar or time function, such as selecting contracts with particular maturity dates, creation dates, trading duration, etc, algorithms based on the average, moving average, or weighted average of a particular attribute of the contract, algorithms based on the most actively traded contracts, hot and cold indexes, technical indicators, investment strategy of the user, or a price settlement that may be set by a trader or a particular market exchange. Further, the selection algorithms may select component contracts with a high correlation or anti/low correlation (inverse correlation) among each other, similar to mutual fund groupings, contra fund, or balance funds. It will be appreciated that a selection algorithm may implement a combination of the algorithms described above.

Once component contracts are selected for inclusion in the composite contract, post processing may be performed by the selection processor 203 to determine the parameters of the composite contract, such as the price or expiration. In determining the parameters of the composite contract, the attributes of the underlying component contracts may be taken into account. Further, a parameterization algorithm may be used to automatically compute the parameters of the composite contract based on the attributes of the underlying component contracts. The parameterization algorithm may also permit control, automated or user level, over the influence of any one or more component contracts on the determined parameters of the composite contract. For example, a scaling contract algorithm may be provided which scales the values of the attributes of the underlying component contracts based on a notional value prior to computing the overall parameters of the composite contract. This scaling may be based on the votes, weighting values assigned to the component contracts during the selection process, or other factors. The composite contract need not have an integer number of each component.

The second interface 209 interfaces the composite contract generator 103 with the trading engine 105. In one embodiment, second interface 209 may be implemented as software that is compatible with the communication link 102. For example the second interface 209 may be implemented as an application program interface (API) program compatible with communication link 102. Alternatively, the second interface 209 may be implemented as a hardware device with pre-processing functionality that is compatible with the communication link 102. For example a network interface, optical sensor interface or Ethernet interface compatible with the communication link 102. In another embodiment, second interface 209 may be implemented as a combination software and hardware that is compatible with the communication link 102. The second interface 209 transmits the completed composite contract to trading engine 105 for trading via the communication link 102. In one embodiment, the first and second interfaces 201, 209 may be combined into a single interface to the communications link 102.

Once the composite contract has been generated and transmitted to the trading engine by the second interface 209, the terminal 101 is notified as such to alert the user(s) that the composite contract is complete and available for trading. In one embodiment, notifier 211 may be implemented as software that is compatible with the communication link 102. For example the notifier 211 may be implemented as an application program interface (API) program compatible with communication link 102. Alternatively, the notifier 211 may be implemented in hardware with pre-processing functionality that is compatible with the communication link 102. For example, the notifier 211 may include a network interface, optical sensor interface or Ethernet interface that is compatible with the communication link 102. In another embodiment, notifier 211 may be implemented as a combination of software and hardware that is compatible with the communication link 102. Notifier 211, through a connection with the selection processor 203, receives a transmission that trading is occurring at the trading engine 105. The notification of trading is transmitted from the notifier 211 through the communication link 102 to the terminal 101. In one embodiment, the first and second interfaces 201, 209 may be combined with the notifier 211 as a single interface with the communications link 102.

Referring to FIG. 1, in an alternative embodiment, the composite contract generator 103 and trading engine 105 are coupled with a composite contract terminator 107 by communications link 102. The composite contract terminator 107 is capable of terminating trading of a particular one or more composite contracts based on user or exchange specified criteria, such as particular events or threshold levels. The terminator 107 removes composite contracts from the market according to pre-defined or dynamic criteria, as will be described below.

Figure 3:
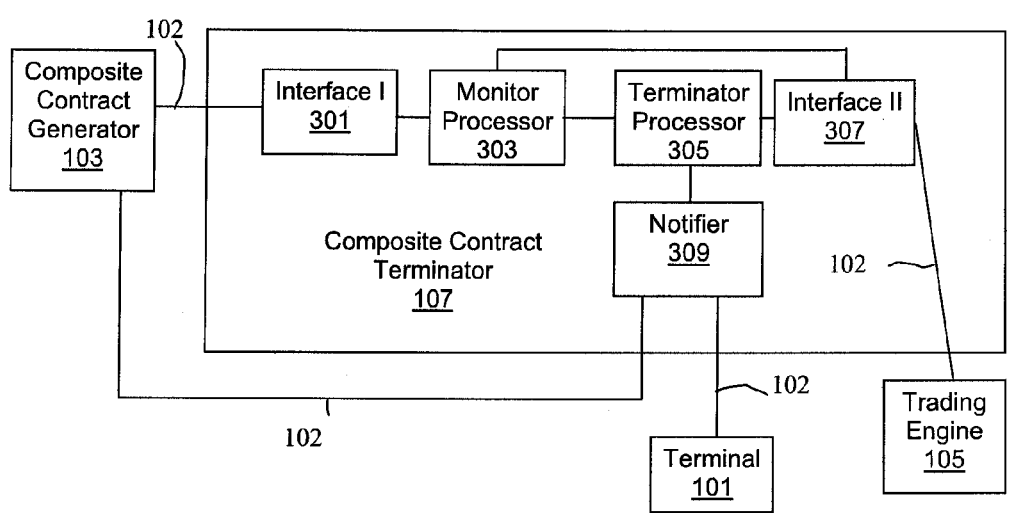
FIG. 3 illustrates a schematic diagram of one embodiment of an optional composite contract terminator for use with the system of FIG. 1.

FIG. 3 illustrates a schematic diagram of one embodiment of a composite contract terminator 107. The composite contract terminator 107 receives information from the composite contract generator 103 and the trading engine 105, then compares and analyzes the information with any event or threshold level stored in the contract terminator to determine if trading of the composite contract should be terminated.

The composite contract terminator 107 includes a first interface 301, a monitor processor 303 coupled with the first interface 301, a terminator processor 305 coupled with the monitor processor 303, a second interface 307 coupled with the terminator processor 305 and a notifier 309 also coupled with the terminator processor 305.

In one embodiment, first interface 301 may be implemented as software that is compatible with the communication link 102. For example the first interface 301 may be implemented as an application program interface (API) program compatible with communication link 102. Alternatively, the first interface 301 may be implemented in hardware with pre-processing functionality that is compatible with the communication link 102. For example, the first interface 301 may include a network interface, optical sensor interface or Ethernet interface that is compatible with communication link 102. In another embodiment, first interface 301 may be implemented as a combination of software and hardware that is compatible with the communication link 102. First interface 301 is operatively coupled with the monitor processor 303.

The first interface 301 receives information from the selection processor 203 in composite contract generator 103 indicating criteria for terminating the composite contract currently being submitted for trading to the trading engine. The first interface 301 transmits the information to the monitoring processor 303. In an alternate embodiment, the first interface 301 also receives information from data storage 207, wherein the first interface 301 transmits this information to the monitor processor 303. This information from the data storage 207 may include market data information, expert opinion, financial quotes, and/or other information which can be utilized in the determination of whether or not to terminate trading of a particular composite contract.

The monitor processor 303 monitors the trading engine 105 to check for composite contracts currently being traded by the trading engine 105. Monitor processor 303 is coupled with the trading engine through the second interface 307. Monitor processor 303 transmits information received from the data storage 207 and the selection processor 203 to the termination processor 305 along with information regarding currently trading composite contracts.

In one embodiment, monitor processor 303 may be implemented as a software algorithm. For example the monitor processor 303 may be a processing application program. Alternatively, the monitor processor 303 may be implemented as a hardware device or a combination of hardware and software. The hardware device may include a microprocessor, micro-controller, or digital signal processor having an electronic erasable program read only memory (EEPROM) or Flash memory, static random access memory (RAM), a clocking/timing circuit, or any typical processor utilized in an electrical device.

The termination processor 305 compares the information received from the monitor processor 305 with respect to a particular composite contract and the specified termination criteria to determine if any of the specified criteria have been met, such as the happening of certain event or the crossing of a particular threshold. For example, if the expiration date of the composite contract has been reached, then trading of the composite contract should be terminated. If the termination processor 305 determines that the specified criteria have been met with respect to the particular composite contract being traded, then the termination processor 305 terminates the composite contract. Termination of trading of a particular composite contract is accomplished by transmitting a termination command to the trading engine to suspend trading of the particular composite contract. In one embodiment, the termination processor 305 further includes storage (not shown) for storing the specified criteria for terminating various composite contracts currently being traded but whose criteria have not yet been met for termination.

In one embodiment, termination processor 305 may be implemented as a software algorithm. For example, the termination processor 305 may be implemented as a processing application program. Alternatively, the termination processor 305 may be implemented as a hardware device or a combination of hardware and software. The hardware device may include be a microprocessor, micro-controller, or digital signal processor having an electronic erasable program read only memory (EEPROM) or Flash memory, static random access memory (RAM), a clocking/timing circuit, or any typical processor utilized in an electrical device.

Exemplary events, conditions or criterion wherein there is no longer a need to allow trading of a composite contract, and therefore trading should be terminated, include wherein a company or industry does not exist, when one or more components of the contract cease to be offered, when one or more market participants vote to terminate the contract. Exemplary termination thresholds include trading volume thresholds, volatility thresholds, dynamic thresholds which change based on other criteria or any other type of threshold level that has been reached by a component of the composite contract or the composite contract itself. Particular threshold evaluations may be dynamically performed over the a particular window of time, range of price, or range of trading volume, such as volume traded over a fixed period of time, or increase or decrease of some value of the composite contract over a fixed period of time. The period of time for such evaluations may be a sliding window. If the threshold level is based on volume or time the threshold level may require the volume to increase or alternatively decrease over time for the trading to continue.

The second interface 307 couples the composite contract terminator 107 with the trading engine 105 for the purposes of monitoring current trading in composite contracts and transmitting instructions to terminate one or more currently trading composite contracts. In one embodiment, the second interface 307 may be implemented as software that is compatible with the communication link 102. For example the second interface 307 may be implemented as an application program interface (API) program compatible with communication link 102. Alternatively, the second interface 307 may be implemented in hardware with pre-processing functionality that is compatible with the communication link 102. For example a network interface, optical sensor interface or Ethernet interface that includes software that is compatible with communication link 102. In another embodiment, second interface 307 may be implemented as a combination of software and hardware that is compatible with the communication link 102. The second interface 307 is operatively coupled with the termination processor 305 and the trading engine 105. The second interface 307 receives requests to obtain information about currently trading composite contracts or information regarding termination of a composite contract from the termination processor 305, then transmits the requests or information through communication link 102 to the trading engine 105.

Notifier 309, via a connection with the termination processor 305, receives a notification that a termination of trading of a composite contract has occurred. The notifier 309 transmits the notification of termination of the composite contract to the terminal 101, to inform the user, and selection processor 203 of the composite contract generator 103 by utilizing the communication link 102.

In one embodiment, notifier 309 may be implemented as software that is compatible with the communication link 102. For example the notifier 309 may be implemented as an application program interface (API) program compatible with communication link 102. Alternatively, the notifier 309 may be implemented in hardware with pre-processing functionality that is compatible with the communication link 102. For example, the notifier 309 may include a network interface, optical sensor interface or Ethernet interface that is compatible with communication link 102. In another embodiment, notifier 309 may be implemented as a combination of software and hardware that is compatible with the communication link 102.

It will be appreciated that within the composite contract terminator 107, the first and second interfaces 301, 307, as well as the notifier 309, may be combined into a single interface compatible with the communications link 102.

Figure 4:
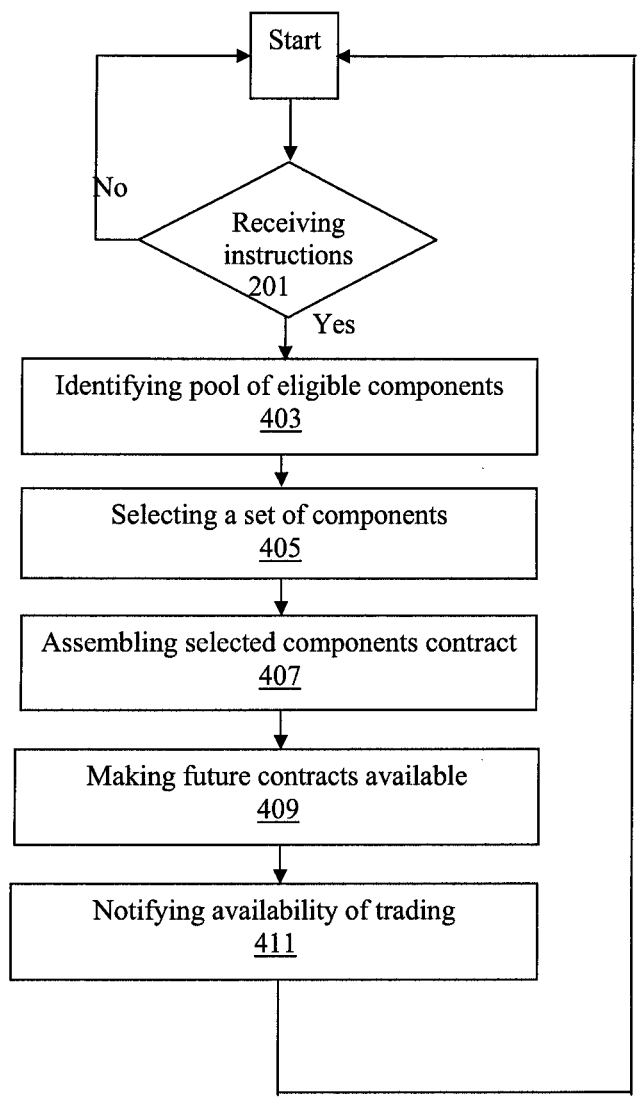
FIG. 4 is a flow chart that depicts the generation of a composite contract by the composite contract system shown in FIG. 1.

FIG. 4 is a flow chart that depicts the generation of at least one composite contract by the composite contract system 100. This flow chart provides an example of how the composite contract is generated by the composite contract system 100.

The composite contract generator 103 receives instructions through first interface 201 to generate one or more composite contracts, which in turn are transmitted to selection processor 203 (block 401). The instructions instruct the composite contract generator 103 to generate at least one composite contract and insert it into a trading engine 105 for trading. In one embodiment, the instructions comprise a simple command to generate a composite contract. In an alternative embodiment, the instructions include criteria for generating the composite contract as described above. In yet another alternative embodiment, the instructions are generated by an automated process internal in the composite contract generator 103 that initiates a generating process. This automated process may be based on market activity, calendar events, etc.

The instructions may be sent from terminal 101 or trading engine 105 through the communication link 102 to the first interface of the composite contract generator 103. In an alternative embodiment, the instructions may be internally generated at the terminal 101 or trading engine 105. In yet another alternative embodiment, the composite contract generator 103 may receive the instruction from a user at terminal 101. The user may be a trader, a broker, or order entry person.

A pool of eligible components contracts selected from all available component contracts is identified at the composite contract generator 103 (block 403). The selection processor 203, as stated above, includes a gathering device, i.e. identifier 205, that brings together all of the eligible component contracts from the available component contracts in data storage 207. In one embodiment, eligible component contracts may be defined as those component contracts existing at the time of the generation of the composite contract. In an alternate embodiment, eligible component contracts may be determined from available contracts based on specified criteria, as described above, such as price, type of financial instrument, volume, volatility etc.

The composite contract generator 103 next selects a set of components contracts from the identified pool of eligible component contracts to create the one or more composite contracts (block 405). More specifically, the selection processor 203 of the composite contract generator 103 chooses the set of component contracts to include in the composite contract(s). As was described above, the selection processor 203 may use different selection algorithms which are based on various factors to select the component contracts.

The selected component contracts are then assembled into the one or more composite futures contract by computing the parameters of the composite contract and associating the composite contract with the selected component contracts (block 407).

The composite contract is then made available to the trading engine 105 for trading by the composite contract generator 103 (block 409). Selection processor 203, via the second interface 209, then transmits the composite contract through the communications link 102 to the trading engine 105. Trading engine 105 receives the composite contract and makes the composite contract available to traders for trading and receives trade instructions and executes trades for the composite contract.

In one embodiment, the composite contract terminator 107 is utilized when the trading engine 105 begins trading the composite contract. The composite contract terminator 107 receives information about the composite contract from the trading engine 105 and market information from data storage 207, as was describe above. The termination processor 305 analyzes all the information it receives with the information related to any event or threshold level or other criteria being reached with respect to a composite contract to decide if the composite contract should be terminated. If the termination processor 305 of composite contract terminator 107 decides that the composite contract should be terminated, then the composite contract terminator 107 instructs the trading engine 105 to terminate trading of the composite contract. Further, the notifier 309 transmits a notification to terminal 101 and composite contract generator 103 indicating that trading of the composite contract has been terminated.

Once the composite contract has been made available for trading, a notification of availability of trading the composite contract is transmitted by the composite contract generator 103 to the terminal 101 (block 411). The composite contract generator 103 utilizes notifier 211 and communication link 102 to transmit the notification to terminal 101.

Once the composite contract has been generated, submitted to the trading engine 105 and the terminal 101 has been notified as such, the composite contract generator 103 resets to respond to the next instruction.

Figure 6:
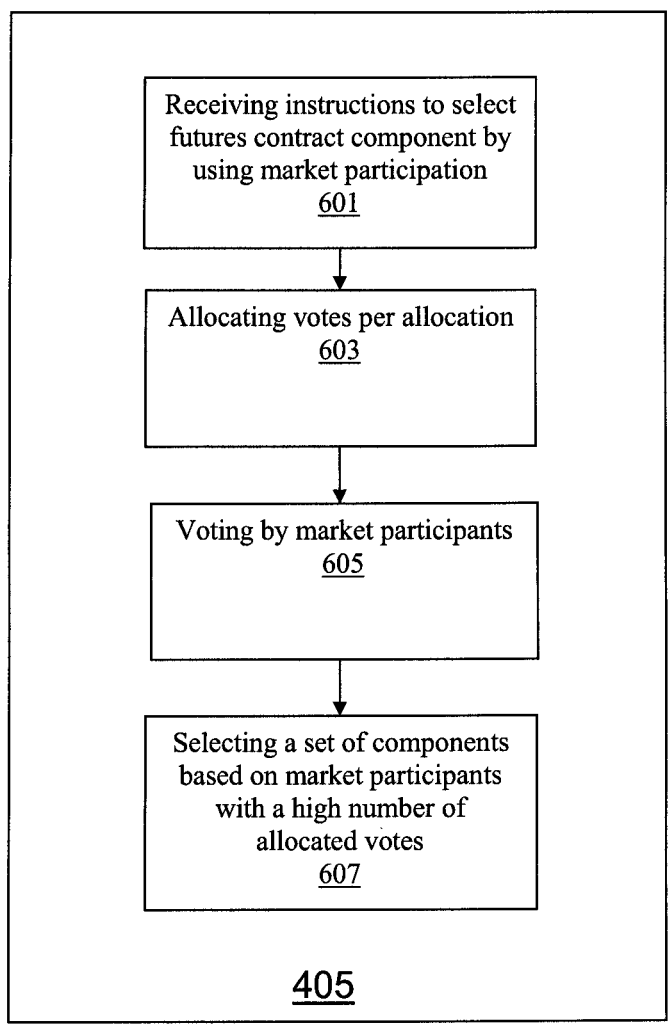
FIG. 6 depicts a market participation function of the flow chart of FIG. 4.

FIG. 6 shows a flow chart depicting operation of a market participation based selection algorithm for use with selection block 405 of the flow chart depicted in FIG. 4. The disclosed embodiments permit the actual traders/participants to decide the composition of the composite contracts that they are trading. Generally, the market participation based selection algorithm allocates votes to various market participants which the market participants can then use to vote for the component contracts that they want included in the resultant composite contract. The algorithm collects the votes and selects the appropriate component contracts based on the vote tally. In one embodiment, the votes cast by a particular market participant also represent a commitment on the part of that participant to generate a prescribed minimum trading volume. In one alternative embodiment, the higher volume that a market participant is willing to commit to, the more votes they are allocated. The market participation based selection algorithm is implemented by the selection processor 203 as described above. Wherein multiple selection algorithms are available, the selection processor 203 first determines to select the component contracts for the composite contract using the market participation based selection algorithm (block 601). This determination may be made based on criteria specified in the composite contract generation instructions, described above. In one embodiment, the selection processor 203 initiates the vote allocation and bidding process wherein "ballots" are distributed to the participants and their votes are collected, tabulated and used in the selection process. There are several types of votes that may be used by the market participants that include fixed votes for component contracts, multi-vote for component contracts and vote for composition.

A fixed voting system for component contracts is a system in which each component of the composite contract is voted on by a trader. For example, every trader is given five votes for five different component contracts. The component contracts with the most votes are pooled together in the composite contract. The component contract may have five component contracts, less or more. The selection of how many component contracts are included can be based on a statistical distribution of votes. In an example, if 90% of the votes are for two particular component contracts than the composite contract includes only those two component contracts. Alternatively, if six component contracts receive 95% of the votes, then the composite contract includes those six component contracts. A standard deviation or other means can be used in the selection of the number of component contracts in the composite futures contract.

A multi-vote system for component contracts allows a trader or person to allocate his votes. For example, if trader 1 got 50 votes, trader 1 may vote all 50 times for a single (eligible) component he really wants in the composite contract. Alternatively, the trader can have 40 votes for the component he most wants and 10 for the second most desirable component.

A vote-for-composition system allows for several compositions to be pre-selected and the market participants can then vote for a particular pre-selected composite contract. The pre-selected compositions may be manually or automatically generated based on inputs from the voting market participants. A single or multi-vote system may be combined with the vote-for-composition system.

It will be appreciated that other voting systems may be used, including hybrids of the above voting systems.

The votes may be allocated where each market participant gets a predetermined number of votes, for example one vote per market participant, as described above. Votes may also be allocated in many different ways, such as allocation of votes based on past trading volume of the composite contract, volume of past trading on any United States of America or any financial exchange, market participant's total interest, market participant's margin account balance etc. (block 603).

In an alternate embodiment, the market participant's votes obligates the market participant to trade a minimum amount of the resulting composite contract. This allocation may be in lieu of or in addition to the allocation of votes described above. For example, if trader 1 commits to trading 50 contracts a day on average and 2 traders commit to trading two contracts a day of the composite contracts, then trader 1 would receive more votes based on the greater commitment. The allocation may be performed before the voting or as part of the voting process. That is, each market participant may be able to cast as many votes as desired and by casting the votes, obligates himself to a predetermined trading volume based on the number of votes cast. The votes may also be weighted by market participant membership rights and/or by the market participant's commitment to trading the proposed composite contract. The market participants may also determine or vote for the number of component contracts in the contract and/or the length/maturity date of the composite contract.

The votes of the market participants are then collected and tallied to determine the component contracts of the composite contract (block 605). In an alternate embodiment, there are two votes, one for the composition of the composite contract and a second vote for the weighting of the each of the selected component contracts. The component contracts of the composite contracts are then selected by the selection processor according to the votes and the process continues at block 407 as shown in FIG. 4 (block 607).

Figure 7:
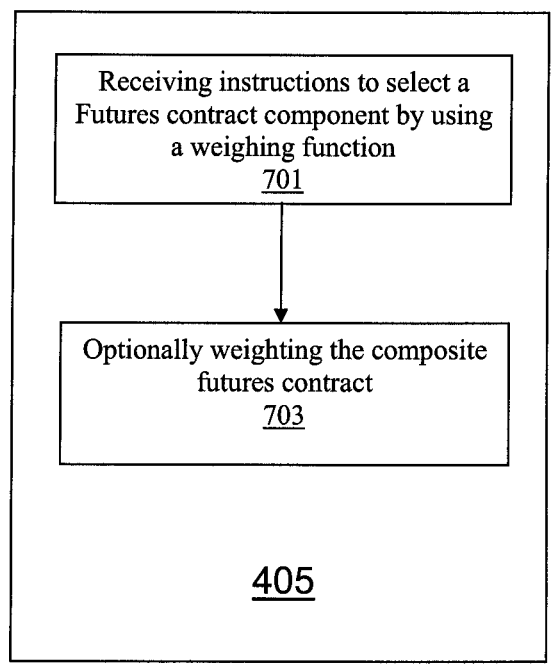
FIG. 7 depicts a weighing function of the flow chart of FIG. 4.

FIG. 7 shows a flow chart depicting operation of a weighting-based post processing algorithm for use with the selection block of 405 of the flow chart depicted in FIG. 4. This weighting-based algorithm is executed on the composite contract after the component contracts have been selected in order to determine the parameters of the composite contract. The selection processor 203 receives an instruction to apply the weighting based algorithm (block 701). The weighting function is then applied to the component contracts of the composite contract (block 703). The weighting function is provided to scale the composite contract such that a notional value of the eligible component contracts is different from the notional value of the composite contract. In particular, the weighting function includes the use of a notional value to diversify the contents and the amount of component contracts in the composite contract. The notional value indicates the total valued of a derivative's or financial instrument's underlying assets. The weighting function represents various percentages of component contracts that make up the composite futures contract. Alternatively, the weighting function can be an integer or non-integer value.

In an alternative embodiment, a system for computing the fees charged in relation to a composite contract is provided. Various fees are charged by exchanges, such as trading fees, e.g. fees charged for placing an order, and clearing fees, e.g. fees charged for providing clearing services for a particular order. Fees are typically charged on a per contract traded basis. These fees may also have associated cap values which limit the total amount of fees charged to a trader or trading account. These caps may be specified on a per commodity basis, i.e. after a certain number of trades of a given commodity in a given time period, e.g. day, week, month, year, etc., for which fees are charged, subsequent trades in that same commodity are free or charged a discounted fee. Alternatively, or in addition, fee caps may be implemented for an individual or a trading account, e.g. after a certain number of trades are executed for which fees are charged, subsequent trades from that same individual or trading account are executed for free or for a discounted fee.

In one embodiment, the exchange desires to encourage traders to trade in composite contracts. One method of encouraging trades in composite contracts is to charge fees which are lower than the fees that would be incurred for separately trading the individual component contracts. In this embodiment, the trading and/or clearing fee of the composite contract is set at a value less than the summation of such fees for the individual component contracts, such as a percentage of the summation of component fees. In one embodiment, the fees charged for the composite contract equal the fees charged for a single component contract. In an alternative embodiment, the fees for trading a composite are discounted by a fixed amount from the equivalent fees charged for the component contracts.

Composite contracts may incur additional fees such as an origination fee charged to the trader who created the composite contract.

Once the fees are charged, proper credit towards the related fee caps must be given. In one embodiment, credit is awarded towards each cap related to an underlying component contract. In an alternative embodiment, additional credit is awarded towards one or more of the fee caps related to an underlying component contract, in order to further encourage trading of the composite contract.

In one embodiment, the trading engine includes a fee processor which monitors trades and charges appropriate fees to traders and/or trading accounts. The fee processor includes a fee calculator and a rate schedule. In one embodiment, the fee processor is implemented as a software program and the rate schedule is stored as a database in a memory or other storage device. The fee calculator references the rate schedule to determine the trading and/or clearing fee to be charged for a particular order. The fee calculator further includes discount logic which recognizes orders placed for composite contracts and computes the appropriate fees as discussed above. The fee processor is coupled with the accounting system of the exchange operating the trading engine to and provides the fee calculations and appropriate trade/trader identification information to the accounting system for billing purposes.

It is intended that the foregoing detailed description be regarded as illustrative rather than limiting and that it be understood that it is the following claims, including all equivalents, which are intended to define the scope of the invention.

We claim:

1. A method for automatically generating a first composite contract, the method comprising:
(a) receiving, by a processor, one or more votes from each of a plurality of market participants, to generate the first composite contract, wherein each of the one or more votes specifies contracts from a first subset of eligible component contracts identified from a set of available contracts provided by an exchange;
(b) selecting, by the processor, a second subset of component contracts from the first subset of eligible component contracts based on the one or more votes from each of the plurality of market participants; and
(c) generating, by the processor, the first composite contract based on the second subset, the first composite contract characterized by a price computed based on a price of each of the second subset of component contracts, wherein the price of the first composite contract, once computed, is disassociated with the price of each of the second subset of component contracts and free to fluctuate independently of the price of each of the second subset of component contracts according to a market on the exchange.

2. The method of claim 1 wherein the generating further comprises:
determining at least one value of at least one attribute of each of the component contracts in the second subset; and
defining at least one parameter of the first composite contract as a function of each of the values.

3. The method of claim 2 wherein the at least one attribute comprises a price of the component contract and the at least one parameter comprises the price of the first composite contract.

4. The method of claim 1 further comprising:
(d) providing notification that the first composite contract is available for trading.

5. The method of claim 1 wherein the selecting further comprises selecting an eligible component contract from the first subset for inclusion in the second subset based on a volatility of the eligible component contract.

6. The method of claim 1 wherein the selecting further comprises selecting an eligible component contract from the first subset for inclusion in the second subset based on at least one attribute of the eligible component contract.

7. The method of claim 1 wherein the selecting further comprises selecting an eligible component contract from the first subset for inclusion in the second subset based on a trading volume of the eligible component contract.

8. The method of claim 1 wherein identifying further comprises identifying an available component contract from the set of available component contracts for inclusion in the first subset based on at least one attribute of the set of available component contracts, wherein the set of available component contracts are represented by data stored on a data storage.

9. The method of claim 1 further comprises obligating the market participant, based on the casting of the at least one vote, to generate a minimum trading volume for the first composite contract.

10. The method of claim 9 wherein the minimum trading volume for the at least one market participant is a function of a number of votes cast by the market participant.

11. The method of claim 1 further comprising selecting an eligible component contract from the first subset for inclusion in the second subset based on the at least one vote cast therefore.

12. The method of claim 1 further comprising allocating a number of votes to each of the plurality of market participants to be cast thereby, the number of votes being allocated based on trading volumes of at least one previously traded composite contract.

13. The method of claim 1, further comprises:
(d) receiving, from the market participant, instruction to generate a second composite contract;
(e) selecting, by the processor in response to the instruction, a fourth subset of component contracts from a third subset of eligible component contracts identified from the set of available component contracts provided by the exchange; and
(f) generating the second composite contract based on the fourth subset, the second composite contract characterized by a price computed based on a price of each of the fourth subset of component contracts, the price of the second composite contract, once computed, being disassociated with the price of each of the fourth subset of component contracts and free to fluctuate independently of the price of each of the fourth subset of component contracts.

14. The method of claim 13 wherein the generating the second composite contract further comprises:
determining at least one value of at least one attribute of each of the component contract in the fourth subset; and
defining the at least one parameter of the second composite contract as a function of each of the values.

15. The method of claim 13 further comprising providing notification that the second composite contract is available for trading.

16. The method of claim 1 further comprising:
monitoring, by the processor, trading of the first composite contract;
determining whether an event has occurred;
terminating trading of the first composite contract when it is determined that the event has occurred; and
generating a notification that trading of the first composite contract has been terminated when trading of the first composite contract has been terminated.

17. The method of claim 16 wherein the event comprises reaching a threshold, the method further comprising terminating, automatically, trading of the composite contract when the threshold is reached.

18. The method of claim 1 wherein the selecting further comprises selecting the second subset of component contracts from the first subset based on criteria specified in the one or more votes.

19. The method of claim 1 wherein the selecting further comprises selecting the second subset of component contracts from the first subset based on a selection algorithm.

20. The method of claim 19 wherein the selection algorithm comprises correlating two or more of the component contracts of the first subset and selecting those component contracts whose correlation exceeds a threshold, computing a weighting value for one or more of the component contracts of the first subset and selecting those component contracts whose weighted value exceeds a threshold, identifying diversification of each component contract of the first subset as compared to each other component contract of the first subset and selecting those component contracts whose diversity exceeds a threshold, or combinations thereof.

21. The method of claim 1 wherein the selecting further comprises selecting the second subset of component contracts from the first subset based on criteria specified in the one or more votes in combination with a selection algorithm.

22. A system for generating a composite contract, the system comprising:
a processor operative to receive one or more votes from each of a plurality of market participants to generate a composite futures contract, wherein each of the one or more votes specifies contracts from a first subset of eligible component contracts identified from a set of available contracts provided by an exchange; and
wherein the processor is operative, based on the instruction, to select a second subset of component contracts from the first subset of eligible component contracts and generate the composite contract based on the second subset, the composite contract characterized by a price computed based on a price of each of the second subset of component contracts, wherein the price of the composite contract, once computed, is disassociated with the price of the each of the second subset of component contracts and free to fluctuate independently of the price of each of the second subset of component contracts according to a market on the exchange; and
a trading engine coupled with the processor, wherein the trading engine is operative to receive the composite contract for trading.

23. The system of claim 22 wherein the processor is operative to monitor trading of the composite contract and terminate trading of the composite contract based on the occurrence of an event.

24. The system of claim 22 wherein the event comprises reaching a threshold, the processor being further to terminate, automatically, trading of the composite contract when the threshold is reached.

25. The system of claim 22 wherein the processor is further operative to select the second subset of component contracts from the first subset based on criteria specified in the first instruction.

26. The system of claim 22 wherein the processor is further operative to select the second subset of component contracts from the first subset based on a selection algorithm.

27. The system of claim 26 wherein the selection algorithm comprises a correlation of two or more of the component contracts of the first subset and a selection those component contracts whose correlation exceeds a threshold, a computation of a weighting value for one or more of the component contracts of the first subset and a selection of those component contracts whose weighted value exceeds a threshold, an identification of diversification of each component contract of the first subset as compared to each other component contract of the first subset and a selection those component contracts whose diversity exceeds a threshold, or combinations thereof.

28. The system of claim 22 wherein the processor is further operative to select the second subset of component contracts from the first subset based on criteria specified in the first instruction in combination with a selection algorithm.

29. A composite contract generator comprising:
an interface operative to receive one or more votes from a plurality of market participants to generate a composite contract, wherein each of the one or more votes specifies contracts from a first subset of eligible component contracts identified from a set of available contracts provided by an exchange, and wherein a processor is further coupled with the interface and operative to receive the instruction therefrom; and
wherein the processor is operative to select, based on the instruction, a second subset of component contracts from the first subset of eligible component contracts, wherein the processor is further operative to generate the composite contract based on the second subset, the composite contract characterized by a price computed based on a price of each of the second subset of component contracts, wherein the price of the composite contract, once computed, is disassociated with the price of each of the second subset of component contracts and free to fluctuate independently of the price of each of the second subset of component contracts according to a market on the exchange.

30. The composite contract generator of claim 29 further comprising a data storage coupled to the identifier, wherein the data storage includes data representative of the available component contracts.

31. The composite contract generator of claim 30 wherein the identifier is operative to access the data representative of the available component contracts from the data storage.

32. The composite contract generator of claim 31, further comprising a notifier coupled to the selection processor, wherein the notifier is operative to transmit information that trading of the composite contract is occurring.

33. The composite contract generator of claim 29 wherein the processor is operative to monitor trading of the composite contract and terminate trading of the composite contract based on the occurrence of an event.

34. The composite contract generator of claim 33 wherein the event comprises reaching a threshold, the processor being further to terminate, automatically, trading of the composite contract when the threshold is reached.

35. The composite contract generator of claim 29 wherein the processor is further operative to select the second subset of component contracts from the first subset based on criteria specified in the first instruction.

36. The composite contract generator of claim 29 wherein the processor is further operative to select the second subset of component contracts from the first subset based on a selection algorithm.

37. The composite contract generator of claim 36 wherein the selection algorithm comprises a correlation of two or more of the component contracts of the first subset and a selection those component contracts whose correlation exceeds a threshold, a computation of a weighting value for one or more of the component contracts of the first subset and a selection of those component contracts whose weighted value exceeds a threshold, an identification of diversification of each component contract of the first subset as compared to each other component contract of the first subset and a selection those component contracts whose diversity exceeds a threshold, or combinations thereof.

38. The composite contract generator of claim 29 wherein the processor is further operative to select the second subset of component contracts from the first subset based on criteria specified in the first instruction in combination with a selection algorithm.

39. A system for generating a composite contract, the system comprising:
means for receiving an instruction from a market participant to generate a composite contract, wherein the instruction is one or more votes for composite contracts;
means for selecting, based on the instruction, a second subset of component contracts from a first subset of eligible component contracts identified from a set of available component contracts provided by an exchange;
means for generating the composite contract based on the second subset, the composite contract characterized by a price computed based on a price of each of the second subset of component contracts, wherein the price of the composite contract, once computed, is disassociated with the price of each of the second subset of component contracts and free to fluctuate independently of the price of each of the second subset of component contracts; and
means for transmitting the composite contract for trading.

40. An apparatus for a composite contract generator, the apparatus comprising:
means for receiving an instruction from a market participant to generate a composite contract, wherein the instruction is one or more votes for composite contracts;
means for selecting, based on the instruction, a set of component contracts from a set of available component contracts provided by an exchange; and
means for generating the composite contract based on the set of component contracts, the composite contract characterized by a price computed based on a price of each of the set of component contracts, wherein the price of the composite contract, once computed, is disassociated with the price of each of the set of component contracts and free to fluctuate independently of the price of each of the set of component contracts.

* * * * *